United States Patent
Jaeckle et al.

(10) Patent No.: US 7,363,043 B2
(45) Date of Patent: Apr. 22, 2008

(54) PASSIVE GSM-BASED SELF-LOCATING DEVICE

(75) Inventors: Thomas H. Jaeckle, San Antonio, TX (US); Richard L. Johnson, San Antonio, TX (US); Michael A. Koets, San Antonio, TX (US); M. LaVarre Bushman, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 10/147,410

(22) Filed: May 16, 2002

(65) Prior Publication Data

US 2002/0193941 A1    Dec. 19, 2002

Related U.S. Application Data

(60) Provisional application No. 60/291,893, filed on May 18, 2001.

(51) Int. Cl.
*H04Q 7/20*  (2006.01)
(52) U.S. Cl. .............................. 455/456.6; 455/456.1; 342/357.1; 342/357.01; 342/464; 342/450; 701/207
(58) Field of Classification Search ................ 455/440, 455/456.1–457, 404.2; 342/450–457, 386–416, 342/417, 357.01–357.1, 357.13, 463, 464; 701/207
See application file for complete search history.

(56) References Cited

U.S. PATENT DOCUMENTS

| | | | |
|---|---|---|---|
| 5,046,130 A * | 9/1991 | Hall et al. ..................... 455/78 |
| 5,128,925 A | 7/1992 | Dornstetter et al. .......... 370/17 |
| 5,508,708 A | 4/1996 | Ghosh et al. ................ 342/457 |
| 5,513,243 A * | 4/1996 | Kage ........................ 455/456.4 |
| 5,629,710 A | 5/1997 | Sawada ....................... 342/457 |
| 6,085,090 A * | 7/2000 | Yee et al. .................... 455/440 |
| 6,108,558 A | 8/2000 | Vanderspool, II ........... 455/456 |
| 6,198,931 B1* | 3/2001 | Smith et al. ................. 455/445 |
| 6,201,803 B1 | 3/2001 | Munday et al. .............. 370/350 |
| 6,216,007 B1* | 4/2001 | Havinis et al. ........... 455/456.2 |
| 6,356,763 B1* | 3/2002 | Kangas et al. ........... 455/456.1 |
| 6,832,093 B1* | 12/2004 | Ranta ....................... 455/456.4 |

FOREIGN PATENT DOCUMENTS

| | | |
|---|---|---|
| EP | 0 767 594 A2 | 4/1997 |
| GB | 2359699 | 8/2001 |
| WO | 00/08886 | 2/0000 |
| WO | 98/52376 | 11/1998 |
| WO | WO9852376 | * 11/1998 |
| WO | WO0008886 | * 2/2000 |

* cited by examiner

*Primary Examiner*—George Eng
*Assistant Examiner*—Marcos L. Torres
(74) *Attorney, Agent, or Firm*—Baker Botts L.L.P.

(57) ABSTRACT

A self locating device that uses GSM signals associated with GSM digital telephone base stations to determine its current location. The device uses GSM common channel signals to determine observed time differences between a local base station and at least two additional base stations. It also uses the common channel signals to identify these base stations and to match the identifications to geographical locations. It further uses a geolocation algorithm to determine the location of the device relative to the base stations, and uses the geographic location data to determine the current geographic location of the device.

17 Claims, 2 Drawing Sheets

PASSIVE GSM-BASED SELF-LOCATING DEVICE

RELATED PATENT APPLICATION

This application claims the benefit of U.S. Provisional Application No. 60/291,893, filed May 18, 2001 and entitled "PASSIVE GSM-BASED SELF-LOCATING DEVICE".

TECHNICAL FIELD OF THE INVENTION

This invention relates to location devices, and more particularly to a location device that uses GSM digital cellular signals to determine location.

BACKGROUND OF THE INVENTION

Applications for wireless systems capable of tracking vehicles and people all over the planet are only beginning to be realized. Companies seeking to tap the commercial potential of these technologies are installing wireless location devices in vehicles, hand-held computers, cell phones, and even watchbands. Scientists have even developed a chip that can be implanted beneath the skin.

Many location systems use the satellite-based Global Positioning System (GPS). This technology has been available for some time for airplanes, boats, cars, and hikers. But companies have only recently begun manufacturing GPS chips that can be embedded in wireless communications devices. GPS uses satellite signals to determine geographic coordinates that indicate where the person with the receiving device is situated.

Other location systems use cellular telephone technology. These devices are typically embedded into cellular telephones, and require both sending and receiving capability. For example, U.S. Pat. No. 5,646,632 describes a technique based on CDMA cellular telephone signals. It requires a transmitter as well as a receiver in the location device, and is dependent on a fixed known time offset between synchronization transmissions.

SUMMARY OF THE INVENTION

One aspect of the invention is a self locating device that uses GSM signals transmitted by GSM base stations to determine its geographic location. The device has a receiver operable to receive GSM common channel signals from a local base station and from at least two additional base stations. An observed time difference measurement unit is operable to receive the GSM signals from the receiver and to measure the observed time differences between the local base station and each of the two additional base stations. A database memory stores data representing geographic locations of base stations near the device. A processing unit receives observed time difference data from the measurement unit and geographic location data from the database memory, and uses that data to determine device location data representing the current location of the device.

An advantage of the invention is that its performance, as compared to the performance of GPS systems, deteriorates less in urban areas. As compared to other location systems based on digital cellular technology, it does not require that the device be capable of transmitting signals; the device need only receive.

DETAILED DESCRIPTION OF THE INVENTION

Figure 1:
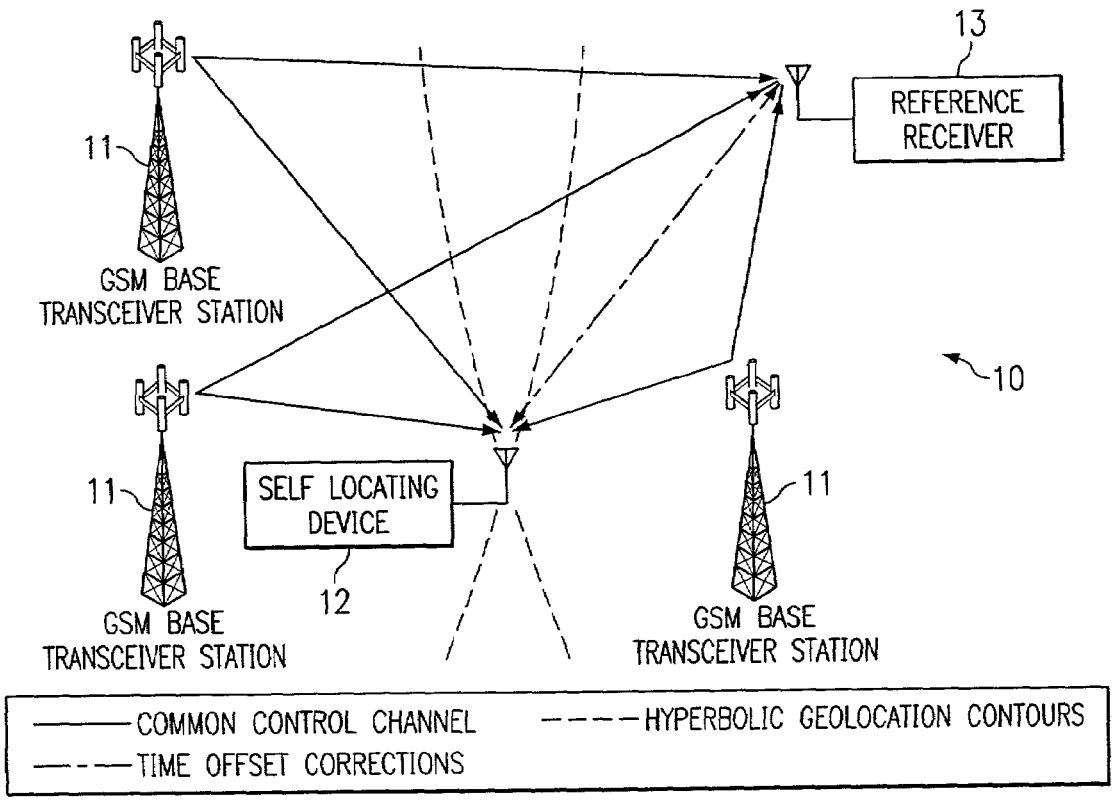
FIG. 1 illustrates a GSM network and the self locating device that is the subject of the invention.

The following description is directed to a location system that is based on one of the various standards under which digital cellular telephone systems operate. This standard is known as the Global System for Mobile Communications (GSM) standard. In the United States, a GSM derivative known as PCS1900, is used.

A GSM network can be divided into three main parts. The mobile station is carried by the user. The base station subsystem controls the radio link with the mobile station. The network subsystem performs call switching and mobility management.

More specifically, each mobile host communicates with other hosts via Base Station Systems (BSSs). Each base station system includes a Base Station Controller (BSC) and one or more Base Transceiver Station (BTSs). Each base transceiver station serves one Cell, and it is in contact with the mobile hosts via radio interfaces. A cell is a small geographic area surrounding a base transceiver station within which a mobile host can communicate with the BTS. A base transceiver station provides voice and data transmission using an A-bis interface between itself and the Base Station Controller (BSC). Each base station controller performs radio resource management for all the cells controlled by it, and provides a system for managing the underlying base transceiver station. A base station controller also manages inter-cell hand-offs of mobile hosts moving between cells associated with the base transceiver stations managed by it. Each base station controller is in contact with one Mobile-service Switching Center (MSC) via an A-interface. The mobile-service switching center is responsible for switching, routing, call control, paging, resource allocation, location registration, encryption, and accounting. A mobile-service switching center provides routing and connectivity to the rest of the wired network for one or more base station controllers.

Under the GSM standard, one or more carrier frequencies are assigned to each base station. Each of these carrier frequencies is then divided in time, using a TDMA (time division multiple access) scheme, in which the fundamental unit of time is a burst period. Eight burst periods are grouped into a TDMA frame, which forms the basic unit for logical channels. Channels are defined by the number and position of their burst periods.

GSM channels can be divided into dedicated channels, which are allocated to a mobile station, and common channels. For conventional digital telephone applications, common channels can be accessed by both idle mode and dedicated mode telephones. The common channels are used by idle mode telephones to exchange signaling information required to go into dedicated mode. Telephones already in dedicated mode monitor the surrounding base stations for handover and other information, using the common channels. These channels share a single radio frequency by using it at different times.

One common channel is the broadcast control channel (BCCH). It is used to continuously broadcast, on a downlink, information such as base station identity, frequency allocations, and frequency hopping sequences.

Two other common channels are the frequency correction channel (FCCH) and the synchronization channel (SCH). These channels are used to synchronize the mobile station to the time slot structure of a cell by defining the boundaries of burst periods and the time slot numbering. Every cell in a GSM network broadcasts one FCCH and one SCH.

The FCCH and SCH channels use an F burst and an S burst structure, respectively. These bursts have an internal structure that differs from normal data bursts, thus allowing synchronization.

FIG. 1 illustrates a GSM network 10, as well as the self locating device 11 that is the subject of the invention. An optional reference receiver 13 is also illustrated. For network 10, only three base transceiver stations (BTSs) 11 are illustrated. In real world application, the network 10 has such stations covering vast geographic areas.

Each BTS 11 serves a cell of the system 10, often with sufficient overlap to avoid dead spots. However, device 12 is operable so long as it can receive GSM signals from any three BTS's 11. The BTS's 11 may be conventional GSM stations and operate in a conventional manner. In general, the BTSs 11, as well as a base station controller (BSC) (not shown) and mobile services switching center (MSC) (not shown) operate as described above.

Each self locating device 12 is a specialized telephone signal receiving device that communicates with the BTS's 11. As described below, the invention is directed to use of GSM signals received from multiple BTS's 11 to determine the location of device 12. A feature of the invention is that device 12 need not transmit to the BTS's 11. Further details about the internal components of device 12 are described below in connection with FIG. 2. Device 12 may or may not be mounted or embedded in some larger unit, such as a vehicle.

In operation, device 12 processes BTS common channel transmissions in a manner similar to a mobile telephone 11. More specifically, device 12 searches for the FCCH, SCH, and BCCH of the cell in which it is located. Because device 12 need only receive common channels, its mode of operation is akin to the idle mode of a cellular phone.

Figure 2:
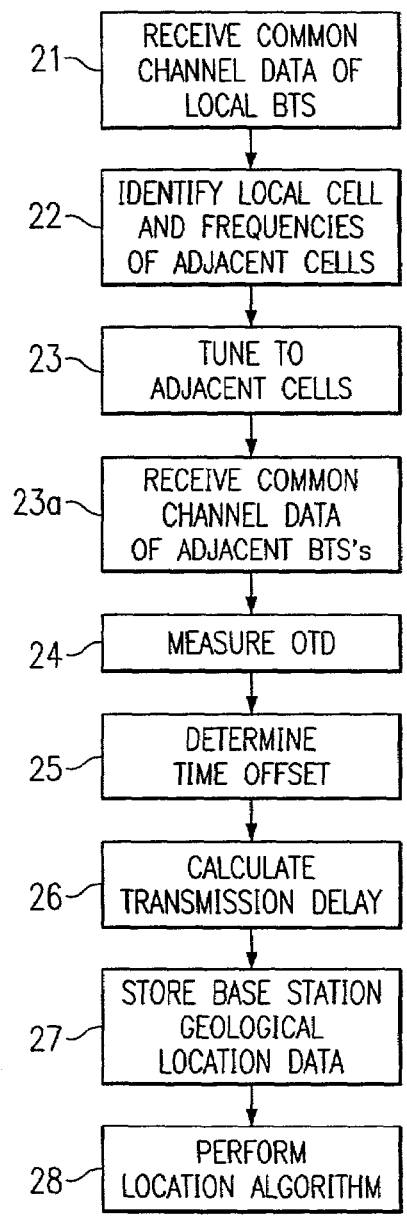
FIG. 2 illustrates how the self locating device determines its location.

FIG. 2 illustrates how device 12 determines its location. As explained below in connection with FIG. 3, this is accomplished using various memory and processing or logic components of device 12.

In Step 21, to find the most local cell, device 12 scans the possible physical channels that have the highest apparent power levels. When such a channel is found, device 12 tunes to an appropriate frequency separation above the center of the channel to determine if power at that frequency is greater than the noise in the rest of the channel. If so, the FCCH for that cell has been located. If not, device 12 continues to search other channels with high apparent power levels. Device 12 continues this process until the FCCH is located in frequency.

Once the FCCH has been located, device 12 monitors this frequency and looks for SCH information in the next frame of data. The SCH information contains the current data frame number and the code sequence for decoding the rest of the cell data. With the information contained in the SCH, the BCCH can be interpreted.

Step 22 is identifying the local cell from the data contained in the BCCH, and also identifying the transmit frequencies used by the adjacent cells. In Step 23, device 12 tunes to the BTS's 11 of at least two adjacent BTS's 11 to obtain their unique identifications. In Step 23a, device 12 receives the common channel data from these adjacent BTS's 11.

In Step 24, device 12 uses the GSM common channel signals to make observed time difference (OTD) measurements on the signals transmitted from the BTS's 11. Specifically, SCH data within the common channel signals are used to measure the OTD between transmissions to the local BTS 11 from the adjacent BTS's 11.

The OTD measurements have two components. The first component is the time offset between two BTS's 12. The second component is the delay associated with the transmission time from the BTS 12 to the device 12. This time is proportional to the distance between the BTS 11 and the device 12.

Step 25 is determining the first component, i.e., the time offset. As explained below, there are a number of alternatives for performing this step.

If sufficiently constant, the time offset can simply be stored in memory of device 12. In other words, the BTS's 11 may be synchronized such that they transmit at the same time. In this case, the time offset between the BTS's 11 in the area of the device 12 is measured and stored.

If the time offset is not sufficiently constant, a reference receiver 13 may be used to monitor time offsets for the set of BTS's 11. Reference receiver is in a known location, not necessarily fixed. A single reference receiver 13 can be used to monitor a number of BTS's 11, within a given receiving range. Reference receiver 13 then delivers these offsets to device 12.

As alternatives to reference receiver 13, there are various alternative possibilities for obtaining the time offsets between adjacent BTS's 11. For example, at least one service provider has installed equipment on BTS towers that measures time offsets between adjacent BTS's 12. It may also be possible to disseminate the time offsets by means of the GSM CCCH's (common control channels). These are data channels that are used for transmitting data to any receiver within radio range. Regardless of how the offsets are obtained, their subtraction from the OTD will permit unique position determination.

In Step 26, device 12 subtracts the time offset from the OTD to obtain the component that is proportional to distance.

At this point, device 12 has identified three neighboring BTS's and has determined the transmission delay of a signal from each. What is known is that device 12 is somewhere near each of these BTS's 11.

Step 27 is storing data representing geographic locations of the BTS's 11. This step may be implemented by storing a table that matches the identification data of a BTS 11, as determined by its BCCH data, to its geographic location.

In Step 28, device 12 uses this data to determine its location. It does so by using a technique known as hyperbolic multilateration. The delay between two BTS's 11 defines a curve of possible locations. Device 12 is somewhere on that curve. Referring again to FIG. 1, two hyperbolic geolocation curves are illustrated. One cell is used as a reference cell to determine a curve associated with each of two other cells. The intersection of the curves provides the location of device 12 relative to the BTS's 11. Stored data can be used to map that location to a geographical location.

As indicated above, device 15 is passive with respect to the GSM system 100. It need not transmit any data, and may be used by a person observing device 12 to determine location. If desired however, the location information could be transmitted to an interested party.

Figure 3:
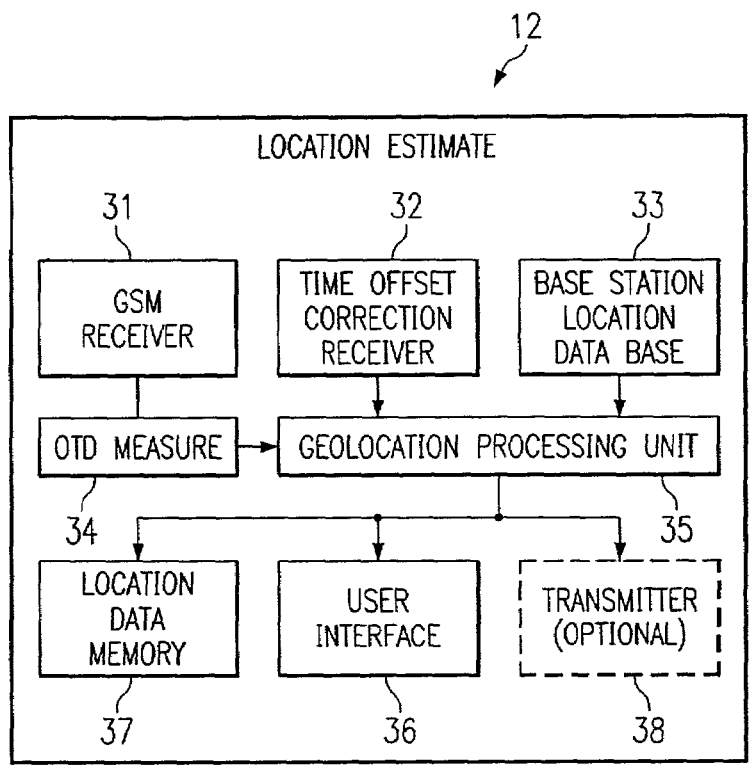
FIG. 3 is a block diagram of one implementation of the self locating device.

FIG. 3 is a block diagram of one implementation of device 12. In general, it has the receiver functionality of a GSM digital cellular mobile telephone, except that it need not process call data. Thus, GSM receiver 31 processes common channel signals in the manner discussed above. The offset receiver 32 is used for embodiments in which offset data is transmitted to device 12 from other locations. Alternatively, as described above, offset receiver 32 may be replaced by offset memory (not shown), which stores offset data. A base station location database 33 matches the identifications of surrounding BTS's 11 to their locations. Appropriate logic and counter circuitry 34, which may include signal processing hardware and software, is used to measure OTD data. The geolocation processing described above is performed by processing unit 35, which may be implemented with firmware (with hardware logic) or be processor-based (with programming logic) depending on the complexity and additional functionality desired for device 12. Thus, processing unit 35 has whatever memory and processing logic are required for implementing the processing described above in connection with FIG. 2. The location estimate may be displayed with a user interface 36. If desired, location data at desired intervals of time may be stored in location memory 37 for record keeping purposes. As discussed below, an optional transmitter 38 may be added and used to transmit location data to a remote location monitoring station.

Figure 4:
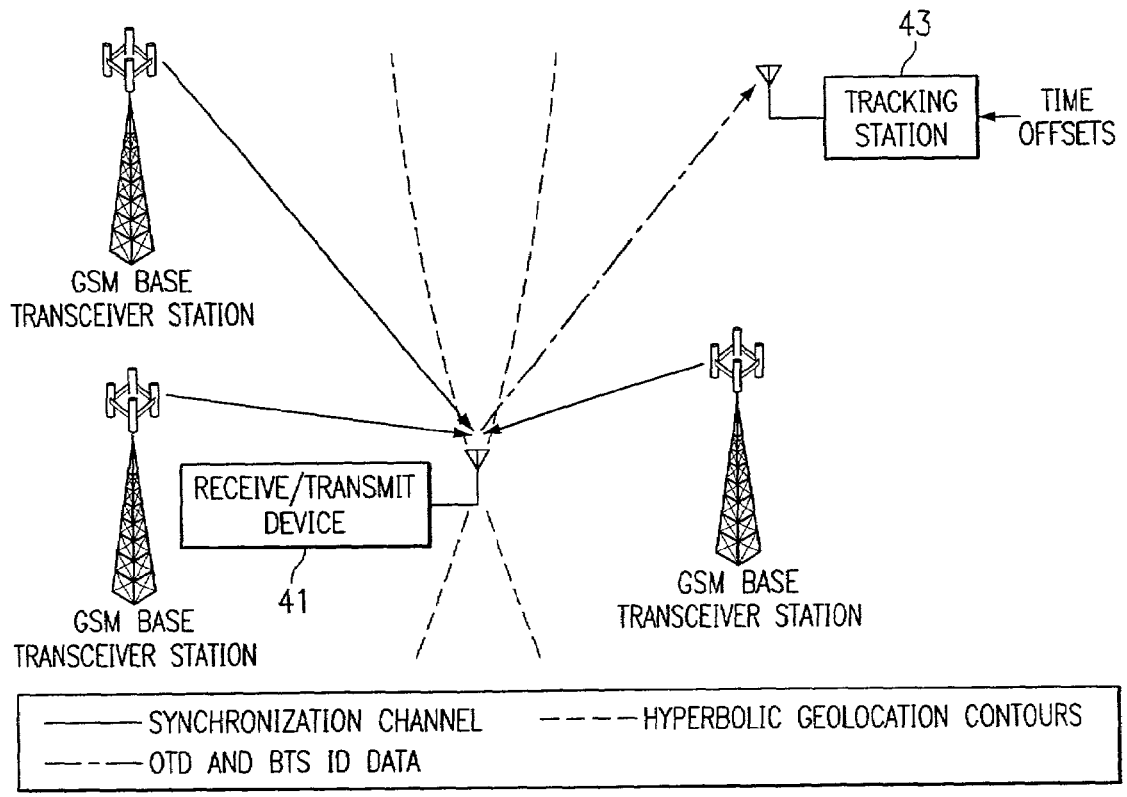
FIG. 4 illustrates an alternative embodiment of the invention, in which the self locating device is equipped with a transmitter.

FIG. 4 illustrates an alternative embodiment, in which device 12 is replaced with a simple receive/transmit device 41, which transmits to a remote tracking station 43. In this embodiment, device 41 need not resolve the OTD measurements into the two components or perform the subsequent processing of FIG. 2. Instead device 41 transmits OTD and BTS data to a party interested in tracking device 41, such as a party located at tracking station 43. Using this communications link, device 41 transmits the BTS identification to the interested party along with the OTD. The time offset can be supplied to or determined at the tracking station 43, which has appropriate processing for calculating location as described above.

Figure 5:
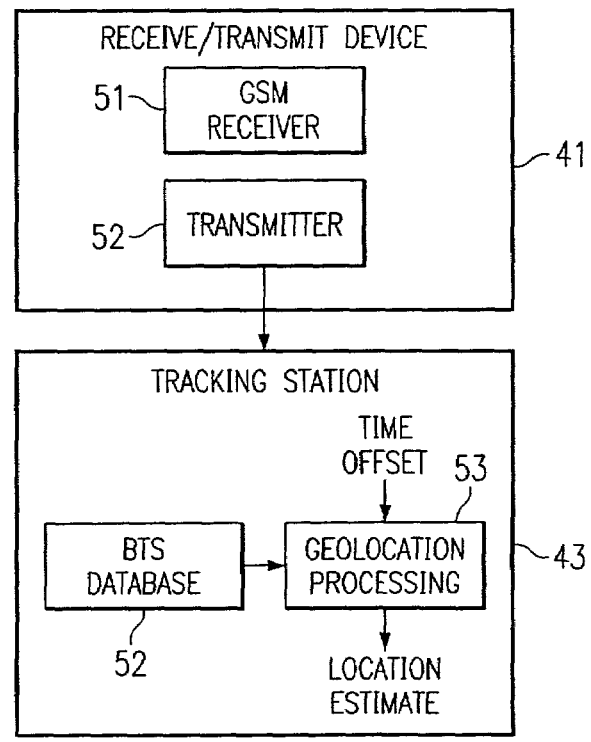
FIG. 5 illustrates the internal components of the equipment used for the embodiment of FIG. 5.

FIG. 5 illustrates the internal components of device 41 and tracking station 43 for the embodiment of FIG. 4. Device 41 need only have a GSM receiver 51 and transmitter 52. The processing unit 53 for calculating location is part of tracking station 43, as is a BTS database 52.

With regard to all embodiments of the invention, as compared to a device using the global positioning system (GPS), device 12 or device 42 is better suited for geolocation in dense urban environments, inside buildings, and in other situations not compatible with GPS monitoring. Its passive operation is suited for concealments without detection of RF transmissions.

If desired device 12 or 42 could also include a GPS receiver. If a GPS location is obtained, and the OTDs measured, the device could use the GPS-determined location as a starting point, and perform a form of dead-reckoning if the GPS signals were to be lost.

OTHER EMBODIMENTS

Although the present invention has been described in detail, it should be understood that various changes, substitutions, and alterations can be made hereto without departing from the spirit and scope of the invention as defined by the appended claims.

What is claimed is:

1. A passive self locating device that uses GSM common channel signals (containing FCCH, SCH, and BCCH data) transmitted by GSM base transceiver stations (BTS's) associated with a GSM network to determine its geographic location, comprising: a receiver to locate a most local BTS by scanning GSM common channel signals and identifying a common channel signal having the highest power level, thereby identifying the common channel frequency of the most local BTS; the receiver further to monitor the common channel frequency of the most local BTS, obtain the SCH data and interpret the BCCH data from the most local BTS to identify the most local BTS, and obtain common channel frequencies of at least two additional BTS's; the receiver further to tune to the additional BTS's, to obtain their identities, and to receive SCH data from the additional BTS's; an observed time difference measurement unit to use the SCH data to measure the observed time differences between transmissions from the most local BTS and the additional BTS's; a database memory that stores data representing geographic locations of BTS's near the device; and a processing unit to receive observed time difference data from the measurement unit and geographic location data from the database memory, and to use that data and time offset data to determine device location data representing the current location of the device; wherein the device determines its location from only GSM common channel signals and the data contained therein, without additional data transmitted from the GSM network, and without authorization from the GSM network and without communication of any nonbroadcast messages within the GSM network.

2. The device of claim 1, further comprising a memory for storing the time offset data, and wherein the processing unit is further operable to correct the observed time difference data with the offset data.

3. The device of claim 1, wherein the receiver is further operable to receive the time offset data, and wherein the processing unit is further operable to correct the observed time difference data with the offset data.

4. The device of claim 1, further comprising a user interface for displaying the device location data.

5. The device of claim 1, wherein the processing unit performs a hyperbolic multilateration process.

6. The device of claim 1, wherein the database memory matches BTS identifications obtained from the GSM signals to geographic locations.

7. A method of passively using a mobile receiving device that receives GSM common channel signals transmitted by GSM base transceiver stations (BTS's) to determine geographic location of the mobile receiving unit, comprising:

locating a most local BTS by scanning GSM common channel signals and identifying a common channel signal having the highest power level, thereby identifying the common channel frequency of the most local BTS;

monitoring the common channel frequency of the most local BTS, obtaining the SCH data and interpreting the BCCH data from the most local BTS to identify the most local BTS, and obtain common channel frequencies of at least two additional BTS's;

tuning to the additional BTS's, to obtain their identities, and to receive SCH data from the additional BTS's;

using the SCH data to measure observed time differences between the local base station and each of the two base stations;

storing data representing geographic locations of BTS's near the device; and calculating the current location of the device, based on the observed time difference data and the geographic location data, and time offset data;

wherein the device determines its location from only GSM common channel signals and the data contained therein, without additional data transmitted from the GSM network, and is operable without authorization from the GSM network and without communication of any nonbroadcast messages within the GSM network.

8. The method of claim 7, wherein the time offset data is accessed from data stored by the unit.

9. The method of claim 8, wherein the time offset data is received by the unit from a remote station.

10. The method of claim 7, wherein the calculating step is performed using a hyperbolic multilateration process.

11. The method of claim 7, wherein the calculating step determines the current location by matching base station identifications obtained from the GSM signals to the stored geographic locations.

12. The device of claim 1, wherein the mobile receiving unit is embedded in other equipment.

13. The device of claim 1, further comprising storing location data over time.

14. The device of claim 1, further comprising a transmitter for transmitting the location data.

15. The device of claim 14, wherein the transmitter is operable to transmit the location data to a receiver not associated with transmission of any GSM signals.

16. The device of claim 7, further comprising transmitting the location data to a remote receiver.

17. The device of claim 16, wherein the transmitting is to a remote receiver not associated with transmission of any GSM signals.

* * * * *